(12) United States Patent
Pierron et al.

(10) Patent No.: US 11,214,123 B2
(45) Date of Patent: Jan. 4, 2022

(54) ELECTRIC AUXILIARY HEATING DEVICE

(71) Applicant: Valeo Systemes Thermiques, Le Mesnil-Saint-Denis (FR)

(72) Inventors: Frederic Pierron, Le Mesnil Saint Denis (FR); Jose Leborgne, Le Mesnil Saint Denis (FR); Serif Karaaslan, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 339 days.

(21) Appl. No.: 16/343,798

(22) PCT Filed: Oct. 17, 2017

(86) PCT No.: PCT/FR2017/052852
§ 371 (c)(1),
(2) Date: Apr. 22, 2019

(87) PCT Pub. No.: WO2018/073530
PCT Pub. Date: Apr. 26, 2018

(65) Prior Publication Data
US 2019/0248210 A1 Aug. 15, 2019

(30) Foreign Application Priority Data

Oct. 21, 2016 (FR) ...................................... 1660263

(51) Int. Cl.
*B60H 1/22* (2006.01)
*F24H 3/04* (2006.01)
*F24H 9/18* (2006.01)

(52) U.S. Cl.
CPC ......... *B60H 1/2225* (2013.01); *F24H 3/0429* (2013.01); *F24H 3/0435* (2013.01);
(Continued)

(58) Field of Classification Search
CPC ... B60H 1/2225; F24H 3/0429; F24H 3/0441; F24H 3/0435; F24H 3/0447;
(Continued)

(56) References Cited

FOREIGN PATENT DOCUMENTS

EP 1486363 A1 12/2004
EP 1821575 A1 8/2007
(Continued)

OTHER PUBLICATIONS

International Search Report and Written Opinion Issued in Corresponding PCT Application No. PCT/FR2017/052852, dated Jan. 22, 2018 (10 Pages with English Translation of International Search Report).

*Primary Examiner* — Shawntina T Fuqua
(74) *Attorney, Agent, or Firm* — Osha Bergman Watanabe & Burton LLP (57) ABSTRACT

The present invention relates to an electric auxiliary heating device (1) for heating a flow of air passing through in particular a conduit of a ventilation, heating and/or air conditioning installation of a motor vehicle, the auxiliary heating device comprising a casing that houses at least one heating module, said casing comprising: ○a heating compartment of which a first end (61) comprises an opening (600) and ○a connection interface (8) comprising: ■a first plate (86) that is essentially planar and extends essentially parallel to the opening so as to cover said opening, and ■a sheath (88) that extends in projection from the first plate (86) opposite the heating compartment, ■slots (80) passing through the first plate (86) and opening inside the sheath (88), the connection interface (8) comprising, on its internal face (89) that is oriented toward the heating compartment, at least one insertion stub (85) of which at least one of the edges facing the slots (80) is chamfered.

6 Claims, 6 Drawing Sheets

(52) U.S. Cl.
CPC ......... *F24H 3/0441* (2013.01); *F24H 3/0447* (2013.01); *F24H 3/0458* (2013.01); *F24H 9/1872* (2013.01); *F24H 2250/04* (2013.01); *H05B 2203/02* (2013.01)

(58) Field of Classification Search
CPC .. F24H 3/0458; F24H 9/1872; F24H 2250/04; H05B 2203/02
See application file for complete search history.

(56) References Cited

FOREIGN PATENT DOCUMENTS

| | | | |
|---|---|---|---|
| EP | 2133225 | A1 | 12/2009 |
| EP | 2145782 | A2 | 1/2010 |
| EP | 2607121 | A1 | 6/2013 |
| FR | 3032588 | A1 | 8/2016 |
| WO | 2007/129608 | * | 11/2007 |
| WO | 2007129608 | A1 | 11/2007 |

* cited by examiner

ELECTRIC AUXILIARY HEATING DEVICE

The invention relates to an electric auxiliary heating device for a motor vehicle, as well as to the method for manufacturing said heating device. More specifically, the invention relates to an electric auxiliary heating device integrated within a ventilation, heating and/or air conditioning installation of a motor vehicle.

Electric auxiliary heating devices generally comprise a casing, in which at least one heating module is inserted. The casing comprises:
- a connection interface that allows the one or more heating module(s) to be connected to an electrical power supply source of the vehicle;
- a heating compartment comprising:
  - a first open end, by which the heating module is introduced and against which the connection interface is affixed;
  - a second end, opposite the connection interface and the first end;
  - at least two cross-pieces connecting the first end and the second end; and
  - at least one column connecting said cross-pieces.

The connection interface and the heating compartment frame the heating module. The one or more column(s) retain(s) the one or more heating module(s) inside the casing formed by the connection interface and the heating compartment.

Such auxiliary heating devices are particularly known from patent applications EP 1821575, EP 1486363 and from patent EP 2133225. However, assembling these various elements together in order to form the auxiliary heating device can be complex and expensive.

One of the aims of the present invention therefore is to at least partially overcome the disadvantages of the prior art and to propose an improved auxiliary heating device for which assembly is simplified.

Therefore, the present invention relates to an electric auxiliary heating device for heating an airflow particularly passing through a conduit of a ventilation, heating and/or air conditioning installation of a motor vehicle, the electric auxiliary heating device comprising a casing housing at least one heating module, said casing comprising:
- a heating compartment, a first end of which comprises an opening; and
- a connection interface comprising:
  - a first substantially flat plate that extends substantially parallel to the opening so as to cover said opening; and
  - a sheath that extends by projecting from the first plate opposite the heating compartment;
  - slots passing through the first plate and emerging inside the sheath,
- the connection interface comprises, on its internal face, rotated toward the heating compartment, at least one insertion stud, at least one of the edges of which facing the slots is chamfered.

According to one aspect of the invention, each slot comprises two insertion studs, an insertion stud being disposed on each of its lateral sides.

According to another aspect of the invention, the at least one insertion stud is integrally formed with the connection interface.

According to another aspect of the invention, the slots on the internal face of the connection interface are chamfered.

Further features and advantages of the invention will become more clearly apparent upon reading the following description, which is provided by way of an illustrative and non-limiting example, and with reference to the accompanying drawings, in which.

Identical elements in the various figures use the same reference signs.

The following embodiments are examples. Even though the description refers to one or more embodiments, this does not necessarily mean that each reference relates to the same embodiment, or that the features only apply to a single embodiment. Simple features of various embodiments can also be combined and/or interchanged in order to provide other embodiments.

Throughout the present description, some elements or parameters can be indexed such as, for example, first element or second element, as well as first parameter and second parameter or even first criterion and second criterion, etc. In this case, it involves simple indexing for differentiating and denoting elements or parameters or criteria that are similar but not identical. This indexing does not imply a priority of one element, parameter or criterion over another, and such designations can be easily interchanged without departing from the scope of the present description. This indexing also does not imply an order of time, for example, for assessing a particular criterion.

Throughout the following description, an orientation will be referred to on the basis of the Longitudinal, Vertical and Transverse axes as they are arbitrarily defined by the L, V, T trihedron shown in FIGS. 1 to 8. The selection of the designations for these axes by no means limits the orientation that the device can assume in its application to a motor vehicle.

Figure 1:
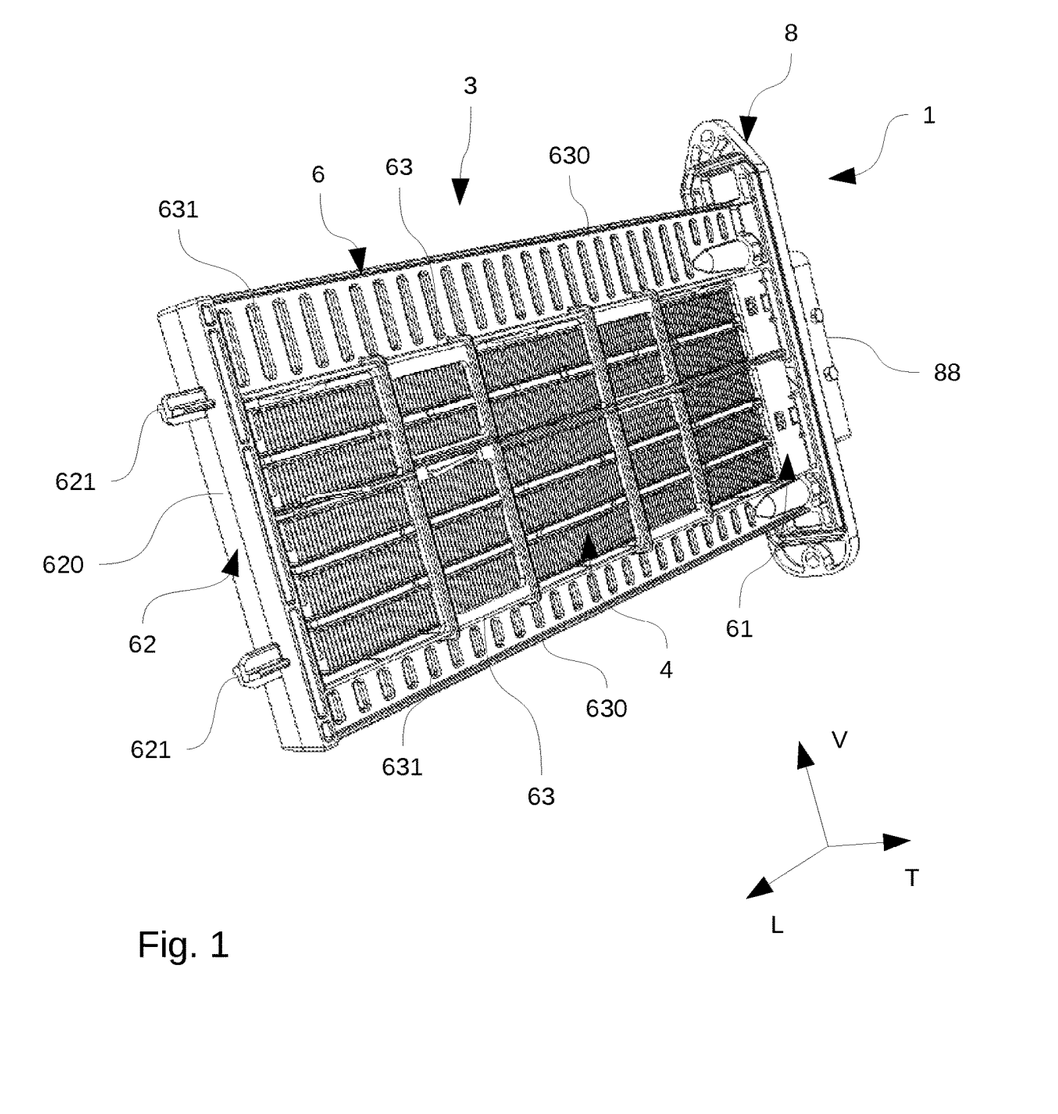
FIG. 1 shows a schematic perspective representation of an auxiliary heating device.

FIG. 1 shows an auxiliary heating device 1 comprising a casing 3 and at least one heating module 4 able to convert an electric current into thermal energy.

The auxiliary heating device 1 is able to be housed in an air circulation conduit of a ventilation, heating and/or air conditioning (HVAC) installation, so as to convert the electrical energy taken from the vehicle into thermal energy and to return it to the air passing through said HVAC.

The HVAC is not shown herein. However, it will be understood that a main conduit of this HVAC conventionally comprises an opening produced in the wall for the insertion of the auxiliary heating device.

The casing 3 is formed by a heating compartment 6, in which at least one heating module 4 can be inserted, along the longitudinal axis L, and by a connection interface 8.

The casing 3 is preferably made from a plastic material, for example, polypropylene or polyamide, charged with glass fibers. The heating compartment 6 and the connection interface 8 can be produced from the same material or even from different materials. For example, the connection interface 8 can be produced from a material that is less heat resistant than the heating compartment 6. Indeed, the heating compartment 6 may be subject to temperatures of approximately 150 to 180° C. due to the heating modules 4, whereas the connection interface 8 for its part may be subject to temperatures of approximately 85 to 105° C.

Figure 2A:
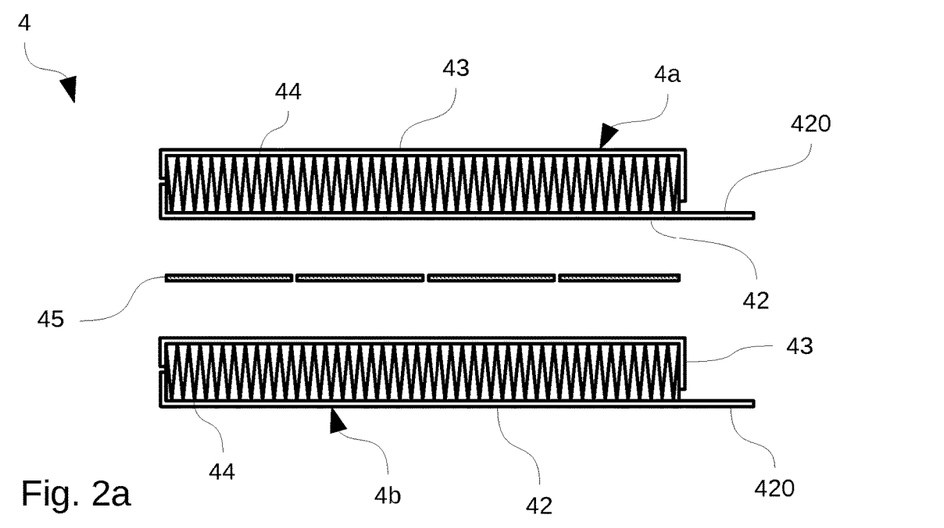
FIGS. 2a and 2b show schematic representations of a heating module according to a first embodiment.
Figure 2B:
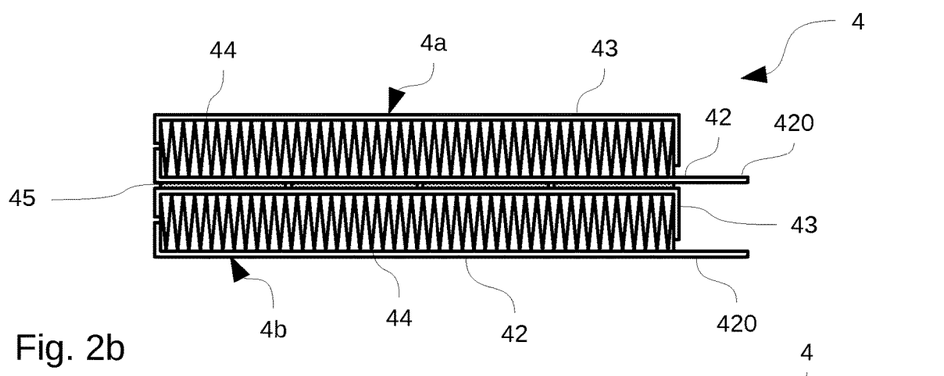
Figure 2C:
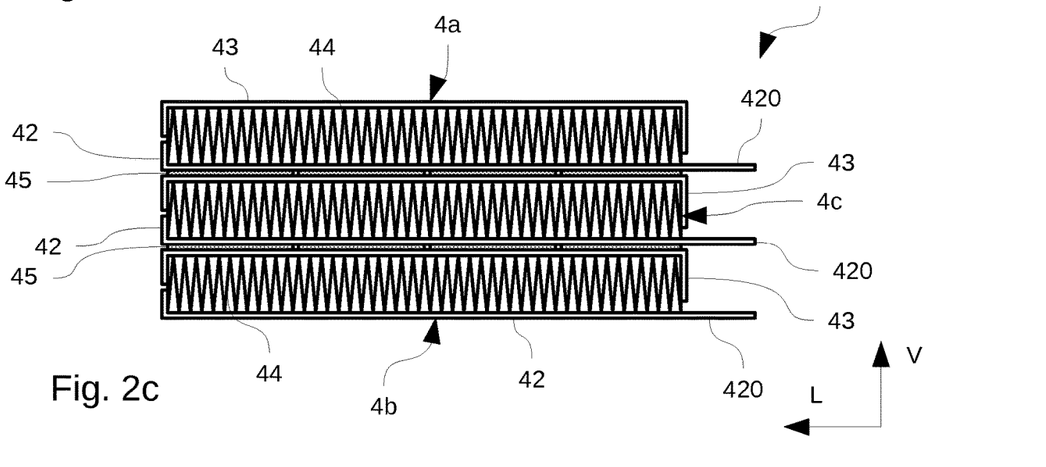
FIG. 2c shows a schematic representation of a heating module according to a second embodiment.

FIGS. 2a to 2c show the heating module 4 in greater detail. The heating module 4 comprises:

- at least two electrical and thermal conductive assemblies 4a, 4b formed by:
  - a conducting electrode 42 longitudinally extended by a free electrode end 420, said free electrode end 420 being able to be connected to the electrical power supply source of the vehicle at the connection interface 8;
  - a retention plate 43 that can be made from a metal material such as aluminum, for example; and
  - an interlayer 44 sandwiched and retained between the conducting electrode 42 and the retention plate 43, the interlayer 44 particularly can be a metal strip folded concertina-wise and placed between the conducting electrode 42 and the retention plate 43 so that an airflow can pass through the interlayer 44;
- at least one ceramic 45 with a positive temperature coefficient (PTC) effect, said at least one ceramic 45 being sandwiched between two conductive assemblies 4a, 4b.

In a first embodiment of a heating module 4 shown in FIGS. 2a and 2b, said heating module 4 comprises two superposed conductive assemblies 4a and 4b, between which PTC ceramics 45 are placed. In the case shown in FIGS. 2a and 2b, four PTC ceramics 45 are disposed side-by-side, but this number can vary, particularly as a function of the length of the heating module 4. The longer a heating module 4, the greater the number of PTC ceramics 45 that is required and, conversely, the shorter the heating module 4, the lower the number of PTC ceramics 45 that is required.

In this first embodiment of the heating module 4, said heating module 4 then comprises two free electrode ends 420, a first free electrode end 420 being able to be connected to a positive electrical power supply terminal and a second free electrode end 420 being able to be connected to a negative electrical power supply terminal.

In a second embodiment of the heating module 4 shown in FIG. 2c, the heating module 4 comprises three superposed conductive assemblies 4a, 4b and 4c, between which PTC ceramics 45 are placed. In the case shown in FIG. 2c, there are four PTC ceramics 45 between two assemblies, but this number can vary, particularly as a function of the length of the heating module 2.

In this second embodiment of the heating module 4, the heating module 4 then comprises three free electrode ends 420, two free electrode ends 420 being able to be connected to a positive electrical power supply terminal, particularly the free electrode ends 420 of the conductive assemblies 4a and 4b placed on the periphery of the superposition of the conductive assemblies 4a, 4b and 4c, and a free electrode end 420 being able to be connected to a negative electrical power supply terminal, particularly the free electrode end 420 of the conductive assembly 4c placed at the center of the superposition of conductive assemblies 4a, 4b and 4c.

Figure 3:
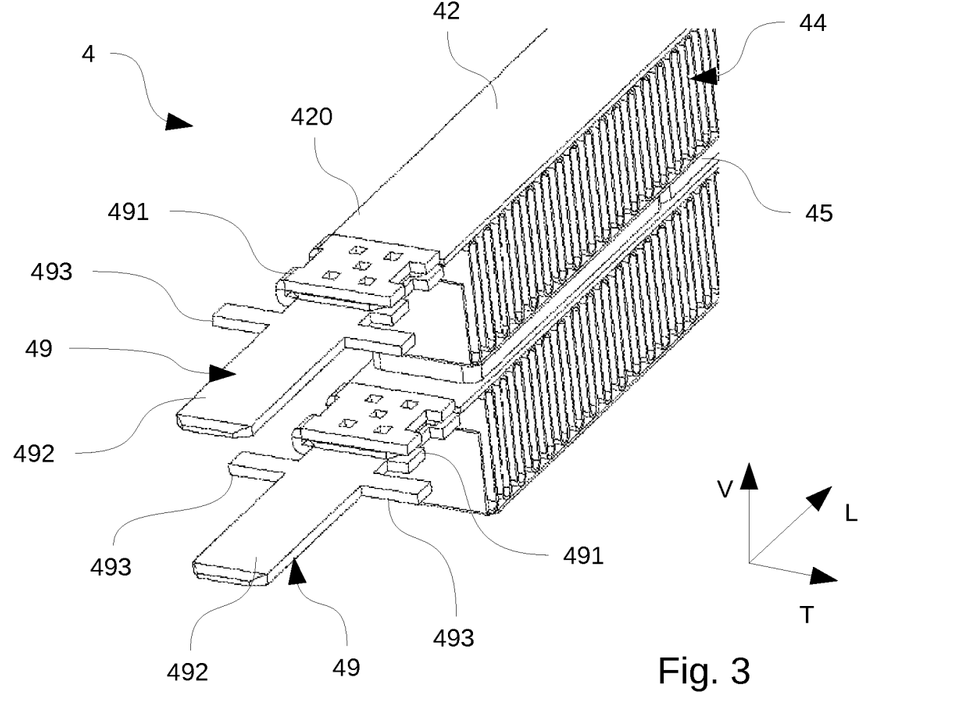
FIG. 3 shows a schematic representation of an end of a heating module.

As shown in FIG. 3, the at least one heating module 4 comprises a terminal 49 for connecting to the electrical wiring set of the vehicle. This connection terminal 49 is disposed on each of the free electrode ends 420 extending the heating modules 4. The connection terminal 49 has a fixing part 491 forming a sleeve that is slightly wider than the width of the conducting electrode 42, in order to be crimped on its free electrode end 420. The connection terminal 49 also has a connection part formed by a tongue 492 that extends into the extension of the free electrode end 420. This tongue 492 in this case has a substantially rectangular section.

These connection terminals 49 act as an interface between the free electrode ends 420 and the electrical connectors, not shown. Indeed, depending on the type of heating module 4, the free electrode ends 420 can be very thin and may not be suitable for directly receiving electrical connectors.

Figures 4, 5:
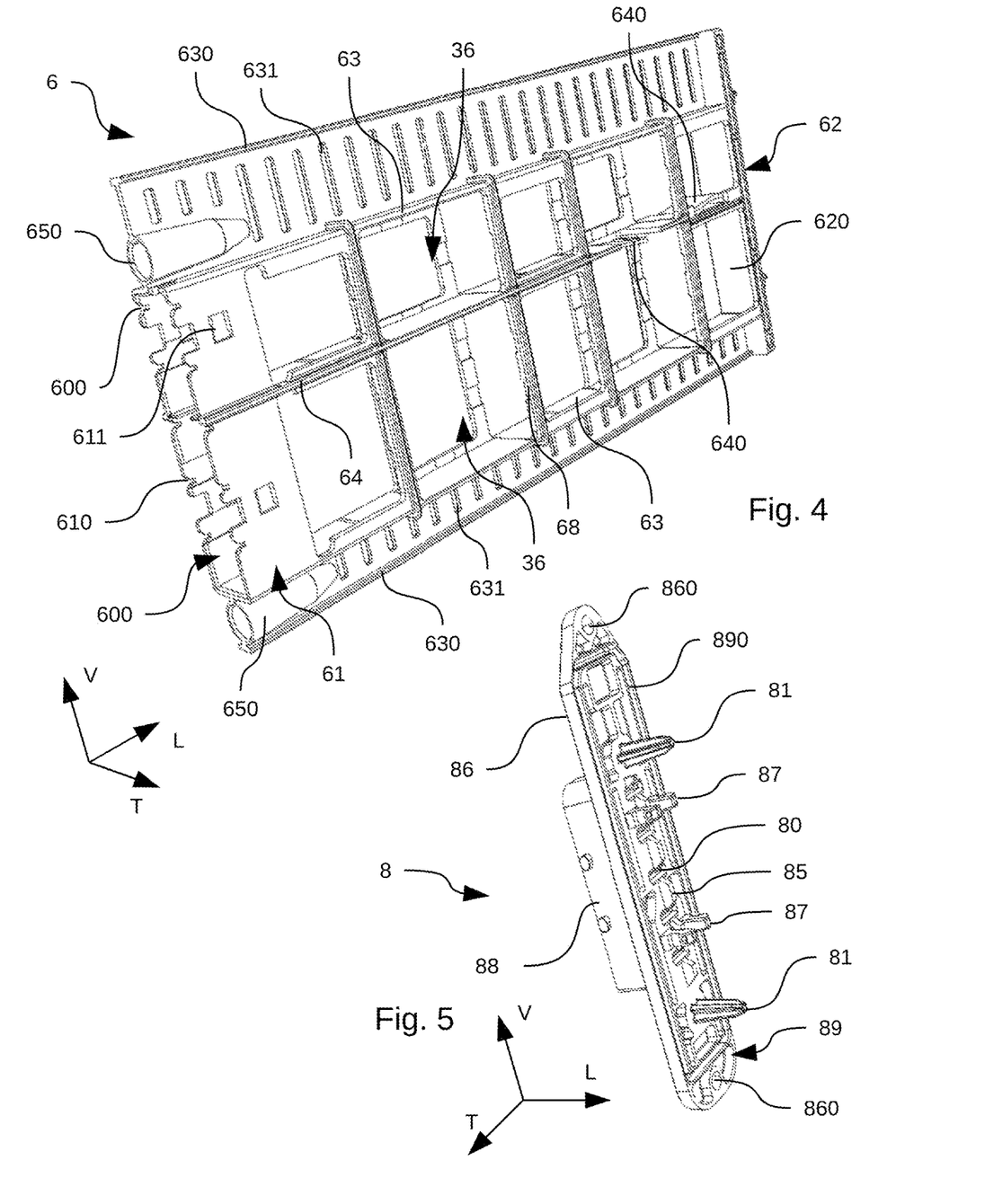
FIG. 4 shows a schematic perspective representation of a heating compartment.
FIGS. 5 and 6 show schematic perspective representations of a connection interface.

The heating compartment 6 is shown in FIG. 4. The heating compartment 6 particularly comprises:

- a first end 61 comprising an opening 600 extending along the plane formed by the vertical axis V and the longitudinal axis L. The at least one heating module 4 is inserted into the casing 3 through the opening 600. The first end 61 also supports the connection interface 8;
- a second end 62, particularly a mechanical fixing end, which is disposed at the other end of the heating compartment 6 opposite the first end 61. Said second end 62 is particularly able to engage with a wall of the conduit of the ventilation, heating and/or air conditioning installation; and
- two side walls 63, parallel to each other and which define the lateral sides of the heating compartment 6. These side walls 63 extend along the longitudinal axis L and act as cross-pieces connecting the first 61 and second 62 ends.

The heating compartment 6 particularly can be in the form of a rectangular parallelepiped, the two main faces of which are perforated to allow the heat discharged by the heating modules 4 housed inside the heating compartment 6 to diffuse into the conduit.

The heating compartment 6 can also comprise deflectors 630 on the side walls 63. These deflectors 630 allow any pressure drops within the HVAC conduit to be increased and controlled in order to redirect the airflow so that it passes through the one or more heating module(s) 4. The deflectors 630 can also comprise openings 631, the number and the size of which are variable depending on the pressure drop requirements.

Columns 68, which may or may not be disposed at regular intervals relative to each other, extend along the vertical axis V over the full height of the main faces of the casing 3 in order to stiffen the heating compartment 6, without adversely affecting the release of heat. The columns 68 extend substantially perpendicular to the side walls 63 from a respective transverse edge in order to connect the side walls 63 together.

As shown in FIG. 4, the heating compartment 6 can also comprise an intermediate wall 64 disposed between the side walls 63, parallel thereto. It is thus possible to define two distinct housings 36 in the heating compartment 6. Each housing 36 can comprise a heating module 4.

The auxiliary heating device 1 can comprise, more specifically, a first heating module 4 according to the first embodiment described above and a second heating module 4 according to the second embodiment described above. These two heating modules 4 are separated from each other by the intermediate wall 64. However, it is entirely possible to contemplate, without departing from the scope of the invention, an auxiliary heating device 1 comprising less or more heating modules 4, according to any embodiment of the heating modules 4.

The intermediate wall 64 can further comprise at least one resilient deformation strip 640, particularly produced by partial punching of a portion of the intermediate wall 64, so that it is articulated on the intermediate wall 64 at a first longitudinal end. This resilient deformation strip has, at the opposite end, a free end that extends, in a rest position of the resilient deformation strip 640, as a projection from the plane defined by the intermediate wall 64, into either one of the housings 36. Preferably, the intermediate wall 64 comprises at least two resilient deformation strips 640, with the free end of each strip projecting into a distinct housing 36. The free end of the resilient deformation strip 640 preferably stops opposite the opening 600 of the first end 61 so as not to hinder the insertion of the heating module 4. The resilient deformation strip 640 acts as a damper and exerts a thrust on the heating module 4 along the vertical axis V so that it can be held in place and stabilized.

The first end 61 is intended to receive a connection interface 8 for connecting the device 1 to an electrical network of the vehicle and for powering the heating modules 4, with the connection interface 8 covering the opening 600. This connection interface 8 is shown in FIG. 5.

The connection interface 8 has an electrical connection function to allow the heating modules 4 to be connected to an electrical energy source and has a mechanical function for sealably closing the opening of the HVAC conduit, by which the auxiliary heating device 1 is inserted.

The connection interface 8 comprises:
- a substantially flat first plate 86 that extends substantially parallel to the opening 600 so as to cover the opening 600, that is in the plane formed by the vertical axis V and the transverse axis T; and
- a sheath 88 that extends by projecting from the first plate 86, along the longitudinal axis L, opposite the heating compartment 6.

Mechanical fixing means associated with the connection interface 8 can be supported by the first plate 86, which has fixing holes 860 allowing mechanical fixing of the auxiliary heating device 1 to the HVAC conduit, for example, by screwing.

The first plate 86 can comprise, on its internal face 89, rotated toward the heating compartment 6, a peripheral groove 890, into which a seal can be located or into which an element of the HVAC can be inserted in order to form a baffle. This provides the air seal between the inside of the site, where the heating compartment 6 extends, and the outside of this site, where the first plate 86, and particularly the sheath 88, extends.

The connection interface 8 has slots 80 passing through the first plate 86, along the longitudinal axis L. The slots 80 emerge inside the sheath 88. The slots 80 have a section that is defined to receive and to guide the connection terminals 49 through the connection interface 8, so that said terminals can extend into the sheath 88 by projecting from the first plate 86.

Figure 6:
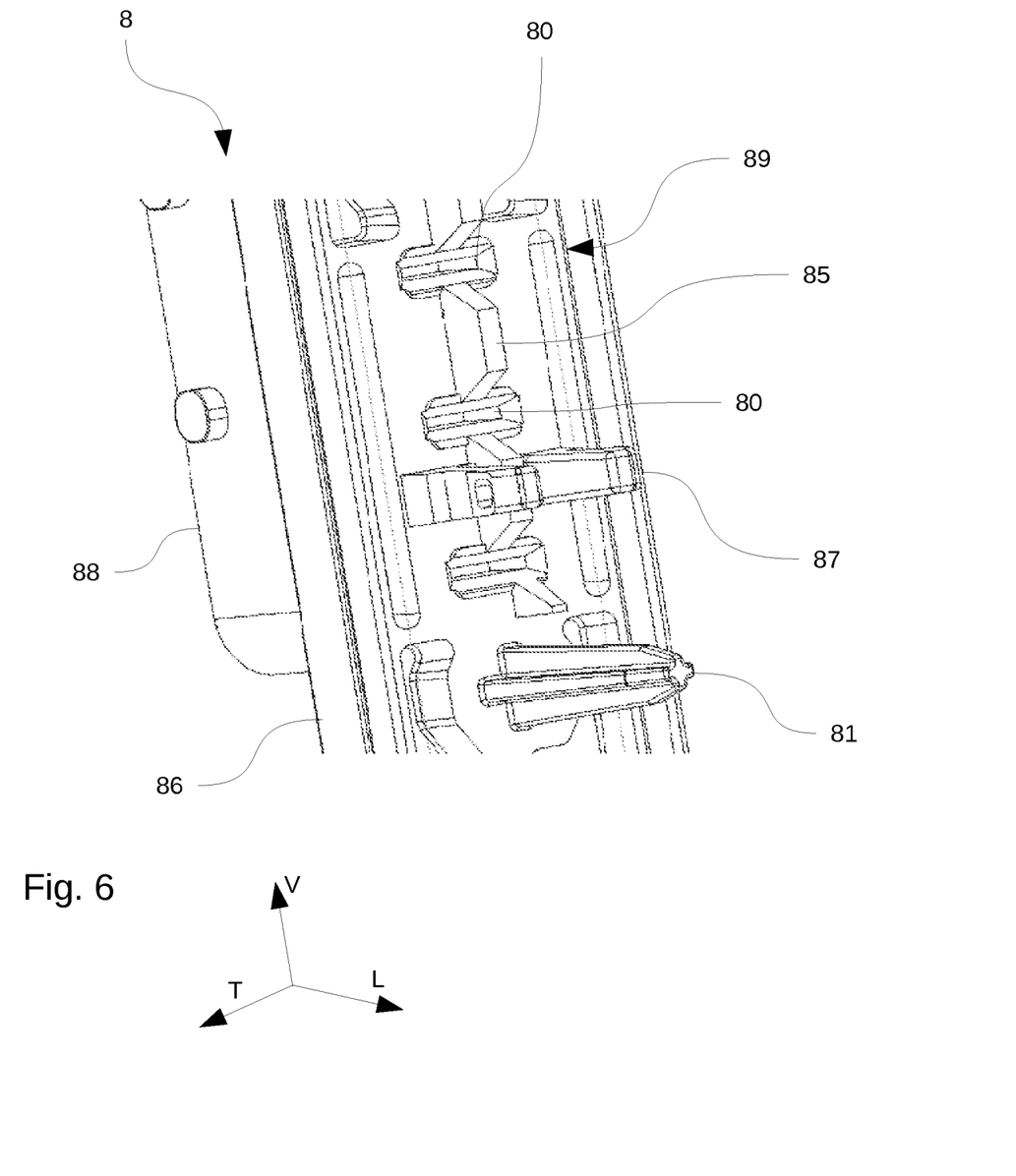

In order to facilitate the insertion of the connection terminals 49 in the slots 80, the connection interface 8 can comprise, on its internal face 89, rotated toward the heating compartment 6, at least one insertion stud 85, at least one of the edges of which facing the slots 80 is chamfered, as shown in FIG. 5 and in greater detail in FIG. 6. Each slot 80 can particularly comprise two insertion studs 85, with an insertion stud 85 being disposed on each of its lateral sides. Preferably, the insertion studs 85 are integrally formed with the connection interface 8.

In order to still facilitate the insertion of the connection terminals 49, the slots 80 on the internal face 86 of the connection interface 8 can be chamfered.

The one or more connection terminal(s) 49 of the heating modules comprise(s) at least one fin 493 projecting on a lateral side of the connection terminal 49 (shown in FIG. 3). This at least one fin 493 is intended to engage in an additional reception notch 610 produced at the first end 61 of the heating compartment 6 (shown in FIG. 4). Preferably, a connection terminal 49 comprises two fins 493 extending on both sides of said connection terminal 49, on its lateral sides, and which engage in two notches 610 produced on both sides of the opening 600 of the first end 61 of the heating compartment 6.

Advantageously, the at least one fin 493 is integrally formed with the connection terminal 49 and can have a rectangular parallelepiped shape.

Figure 7:
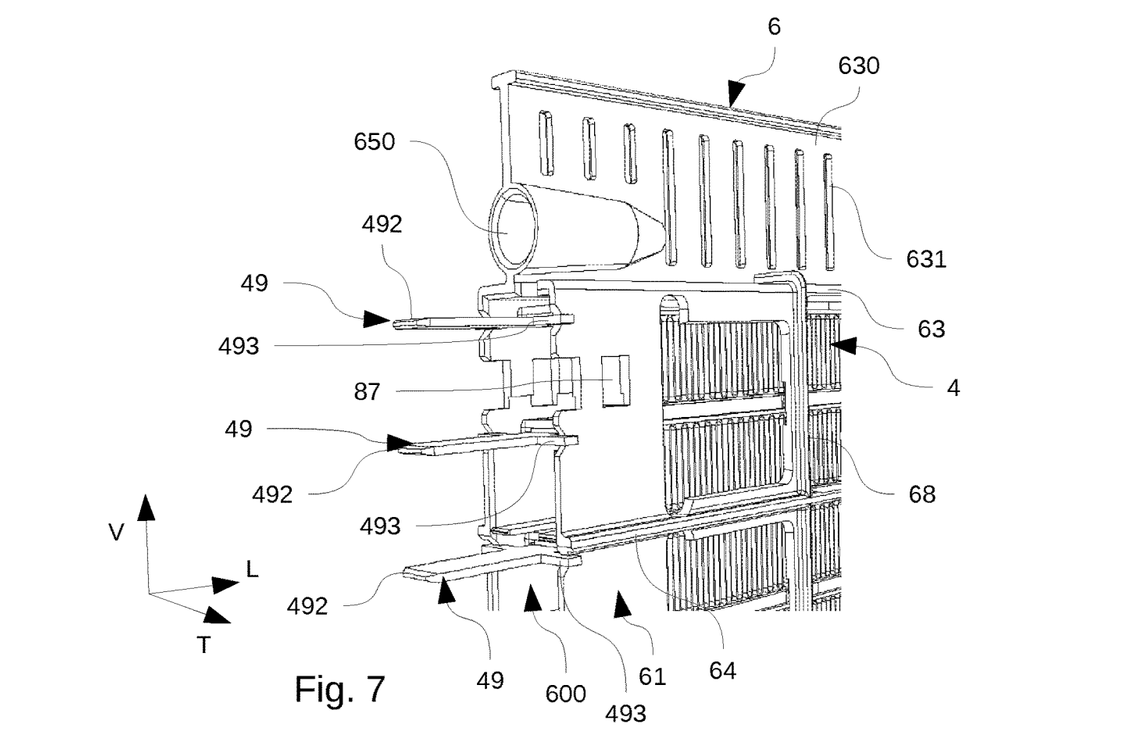
FIG. 7 shows a schematic perspective representation of an end of the heating compartment of FIG. 4.

The depth of the at least one additional notch 610 corresponds to the width of the fin 493. Thus, the edge of said fin 493 can be aligned with the outer peripheral edge of the first end 61 of the heating compartment 6, as shown in FIG. 7.

In order to facilitate the insertion of the at least one fin 493 into the additional notches 610, the openings of said notches can comprise chamfers.

Figure 8:
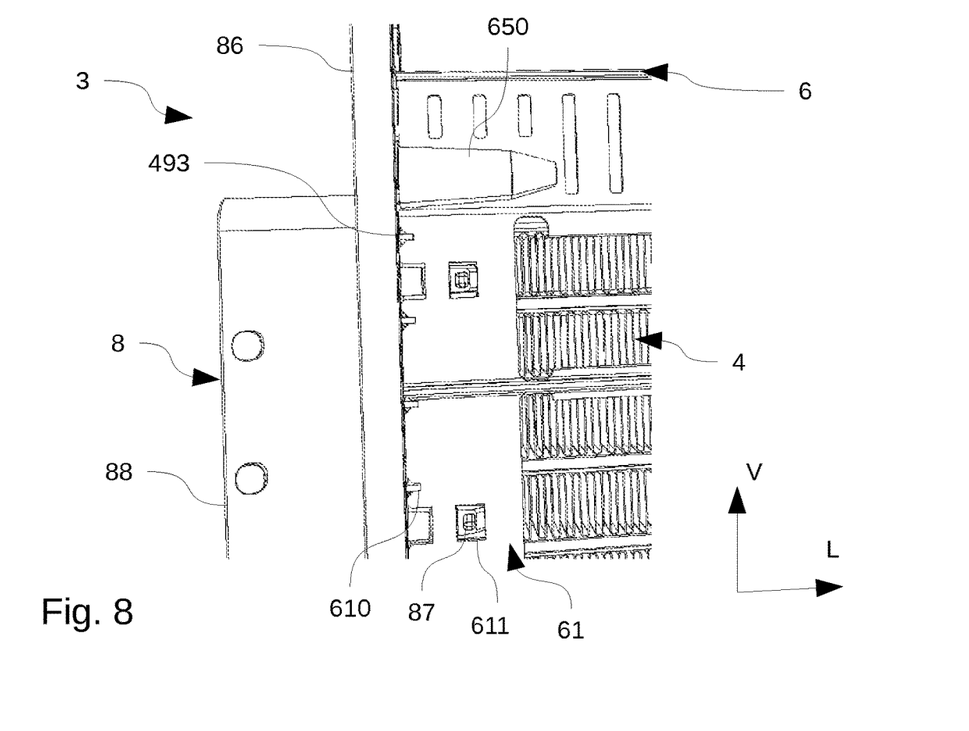
FIG. 8 shows a schematic representation of the connection between a heating compartment and the connection interface.

As shown in FIG. 8, the connection interface 8, when it is fixed to the first end 61, encloses the at least one fin 493 between the bottom of the additional notch 610 and said connection interface 8, more specifically its internal face 89.

These fins 493 allow the free electrode ends 420 of the heating modules 4 to be retained inside the casing 3. The notches 610 limit the movements of the heating modules 4 along the vertical axis V, but also along the longitudinal axis L when the connection interface 8 is fixed.

As shown in FIGS. 5 and 6, the connection interface 8 can comprise, on its internal face 89, rotated toward the heating compartment 6, at least one guide finger 81 projecting toward the first end 61 of the heating compartment 6. As shown in greater detail in FIG. 6, the at least one guide finger 81 can be of conical shape or its end can be in the shape of a cone, the top of which points toward the heating compartment 6. The at least one guide finger 81 particularly can be cruciform or have a form included in a reference cone in order to limit the amount of material. Preferably, and for greater ease of manufacturing, the at least one guide finger 81 is integrally formed with the connection interface 8.

The first end 61 of the heating compartment 6 for its part comprises at least one guide cavity 650 (particularly shown in FIGS. 4, 7 and 8) and is able to receive a guide finger 81.

The at least one guide finger 81 and its guide cavity 650 particularly allow alignment and guidance of the connection interface 8 when it is installed against the first end 61 of the heating compartment 6 in order to form the casing 3.

The connection interface 8 can comprise two guide fingers 81 and the first end 61 of the heating compartment 6 can comprise two guide cavities 650. Preferably, these two guide cavities 650 are disposed on both sides of the opening 600 at the side walls 63. The two guide fingers 81 are for their part disposed on both sides of the assembly formed by the slots 80.

In order to fix the connection interface 8 to the heating compartment 6, the internal face 86 of the connection interface 8 can comprise pronged lugs 87, the ends of which fit into orifices 611 of the first end 61 so as to allow resilient and/or mechanical fitting.

The second end 62 of the heating compartment 6 comprises a second plate 620 (shown in FIG. 1), which extends in the plane formed by the vertical axis V and the transverse axis T, substantially perpendicular to the side walls 63, of the heating compartment 6. This second plate 620 is substantially parallel to the first plate 86 of the connection interface 8.

The second plate 620 can comprise protrusions 621 projecting opposite the heating compartment 6 and being used to position the auxiliary heating device 1 inside the HVAC conduit.

Thus, it is clear that, due to its structure and particularly due to the presence of the fins 493 on the electrical connection terminals 49 associated with the notches 610 of the first ends 61 of the heating compartment 6, the guide fingers 81 associated with the guide cavities 650, as well as the insertion studs 85, the assembly of the auxiliary heating device 1 is facilitated.

The invention claimed is:

1. An electric auxiliary heating device for heating an airflow passing through a conduit of a ventilation, heating and/or air conditioning installation of a motor vehicle, the auxiliary heating device comprising:
   a casing housing at least one heating module,
   said casing comprising:
      a heating compartment, a first end of which comprises an opening, and
      a connection interface comprising:
         a first substantially flat plate that extends substantially parallel to the opening to cover said opening,
         a sheath that extends by projecting from the first plate opposite the heating compartment, and
         slots passing through the first plate and emerging inside the sheath,
   wherein the connection interface comprises, on an internal face, rotated toward the heating compartment, at least one insertion stud, at least one of the edges of which facing the slots is chamfered, and
   wherein the heating compartment comprises a plurality of deflectors that increase and control pressure drops to redirect the airflow so that it passes through the at least one heating module.

2. The electric auxiliary heating device as claimed in claim 1, wherein each slot comprises two insertion studs, an insertion stud being disposed on each of its lateral sides.

3. The electric auxiliary heating device as claimed in claim 1, wherein the at least one insertion stud is integrally formed with the connection interface.

4. The electric auxiliary heating device as claimed in claim 1, wherein the slots on the internal face of the connection interface are chamfered.

5. An electric auxiliary heating device for heating an airflow passing through a conduit of a ventilation, heating and/or air conditioning installation of a motor vehicle, the auxiliary heating device comprising:
   a casing;
   at least one heating module housed in the casing, wherein the heating module comprises two superposed conductive assemblies, between which a number of positive temperature coefficient ceramics are placed; and
   a heating compartment housed in the casing, wherein the heating compartment comprises a plurality of deflectors that increase pressure drops and that control the airflow to pass through the at least one heating module,
   wherein the number of positive temperature coefficient ceramics is proportional to a length of the at least one heating module.

6. An electric auxiliary heating device for heating an airflow passing through a conduit of a ventilation, heating and/or air conditioning installation of a motor vehicle, the auxiliary heating device comprising:
   a casing housing:
      at least one heating module, the at least one heating module comprising:
         at least two electrical and thermal conductive assemblies formed by:
            a conducting electrode longitudinally extended by a free electrode end, said free electrode end configured to be connected to the electrical power supply source of the vehicle at the connection interface,
            a retention plate made from a metal material, and
            an interlayer sandwiched and retained between the conducting electrode and the retention plate, the interlayer comprising metal strip folded concertina-wise and placed between the conducting electrode and the retention plate so that an airflow passes through the interlayer, and
         at least one ceramic with a positive temperature coefficient effect, said at least one ceramic being sandwiched between two conductive assemblies; and
      a heating compartment housed in the casing, wherein the heating compartment comprises a plurality of deflectors that increase and control pressure drops to redirect the airflow to pass through the at least one heating module.

* * * * *